(12) United States Patent
Rappin

(10) Patent No.: US 7,437,796 B2
(45) Date of Patent: Oct. 21, 2008

(54) BACKPACK HAVING A RESERVOIR

(75) Inventor: Craig Rappin, Long Grove, IL (US)

(73) Assignee: Roll, LLC, Cary, IL (US)

( * ) Notice: Subject to any disclaimer, the term of this patent is extended or adjusted under 35 U.S.C. 154(b) by 101 days.

(21) Appl. No.: 11/626,645

(22) Filed: Jan. 24, 2007

(65) Prior Publication Data

US 2008/0172826 A1    Jul. 24, 2008

(51) Int. Cl.
*A47L 5/00* (2006.01)
*E01H 1/08* (2006.01)

(52) U.S. Cl. .......................... 15/327.5; 15/326; 15/405; 224/261; 224/262; 224/628; 224/633; 239/152; 239/154

(58) Field of Classification Search .................. 15/326, 15/327.5, 405; 239/152–154, 373; 224/576, 224/628, 633, 261, 262; *A47L 5/00, 9/00; E01H 1/08*
See application file for complete search history.

(56) References Cited

U.S. PATENT DOCUMENTS

| | | | |
|---|---|---|---|
| 5,176,303 A | * | 1/1993 | Franke ........................ 224/261 |
| 5,195,208 A | | 3/1993 | Yamami et al. |
| 5,813,088 A | | 9/1998 | Wagner et al. |
| 6,409,097 B1 | | 6/2002 | McCauley |
| 6,575,695 B1 | * | 6/2003 | Miyamoto .................. 415/119 |
| 7,007,826 B2 | * | 3/2006 | Shapanus et al. ............ 222/175 |
| 7,021,391 B2 | | 4/2006 | Schasteen |
| 2004/0135004 A1 | | 7/2004 | Fex |

* cited by examiner

*Primary Examiner*—David A Redding
(74) *Attorney, Agent, or Firm*—Neal, Gerber & Eisenberg LLP

(57) ABSTRACT

A backpack frame for a power bower and yard treatment sprayer system is provided in one embodiment of the present invention. The frame includes a first portion and a second portion extending outwardly from the first portion. The second portion is adapted for carrying the power blower thereon and has a hollowed out section. A cavity is further defined by the hollowed out section of the second portion and defined for holding a yard treatment mixture. A supply pipe is provided with a first end in communication with the cavity and a second inlet end positioned externally for filling the cavity with the yard treatment mixture. A tube is also provided with a first end in communication with the cavity and a second exit end positioned externally from the frame and terminating into a flow of air defined by power blower. Lastly, the frame includes straps for attaching the frame on the back of an operator.

7 Claims, 7 Drawing Sheets

BACKPACK HAVING A RESERVOIR

FIELD OF THE INVENTION

The invention relates generally to lawn and garden implements, and more particularly to a backpack having a reservoir used to store a fluid or mixture.

BACKGROUND OF THE INVENTION

Air blowers have been used, typically in lawn and garden applications, to enable an operator to direct a stream of high velocity air toward one or more objects to propel the objects along the ground. The blowers may use electric or gas engines and may be mounted on a frame carried on the back of the operator. The backpacks typically have an L-shaped frame with the blower sitting on the horizontal portion of the frame and straps that go around the operator's arms.

The gas powered air blowers, a small tank may be placed adjacent to or on top of the air blower. The tanks are extremely small and require the operator to stop and refuel numerous times. In instances when the operator is also handling a spray device used to spray a fluid, solution, particulate, or mixture thereof (which is generally referred to herein as mixture), the large tank will oftentimes piggyback on top of the blower. Piggybacking the two devices is done to eliminate the need to keep switching between the air blower and the liquid sprayer. However piggybacking a heavy filed tank on top of an air blower is dangerous. The center of gravity of the entire system becomes too high for the operator, which can quickly lead to an accident and/or injury.

A need therefore exists to provide for a backpack that is safe to use and provides an operator with the ability to mount an air blower thereon and use a liquid sprayer.

SUMMARY OF THE INVENTION

In accordance with an embodiment of the present invention there is provided an

A backpack frame for a power bower and yard treatment sprayer system is provided in one embodiment of the present invention. The frame includes a first portion and a second portion extending outwardly from the first portion. The second portion is adapted for carrying the power blower thereon and has a hollowed out section. A cavity is further defined by the hollowed out section of the second portion and defined for holding a yard treatment mixture. A supply pipe is provided with a first end in communication with the cavity and a second inlet end positioned externally for filling the cavity with the yard treatment mixture. A tube is also provided with a first end in communication with the cavity and a second exit end positioned externally from the frame and terminating into a flow of air defined by power blower. Lastly, the frame includes straps for attaching the frame on the back of an operator.

In another embodiment, there is provided a backpack power bower system. The system includes a frame having a first portion and a second portion extending outwardly from the first portion. The second portion is adapted for carrying an air blower thereon, while the second portion has an interior cavity for holding a mixture. An inlet is provided along the first portion that is in communication with a channel that feeds into the interior cavity. The inlet provides an operator the ability to fill the cavity with the mixture. A tube is also provided that has one end in fluid communication with the cavity for expelling the mixture from the cavity for external use.

In another embodiment, the tube has a second end terminating into an air flow created by the air blower, and wherein the mixture is a yard treatment solution. Further, a second tube may be provided for feeding air from the air blower into the cavity to aid in forcing the mixture out of the cavity.

In another embodiment, the first tube has a second end in fluid communication with the air blower for feeding the mixture into the air blower, wherein the mixture is a fuel or fuel/oil solution.

In addition, straps may be provided for attaching the frame on the back of an operator. The frame may also include a central region on the first portion. The central region would include a plurality of apertures adapted for securing the air blower to the first portion. The frame may further include one or more bumpers positioned on the first and second portions for helping stabilize the blower during operator.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
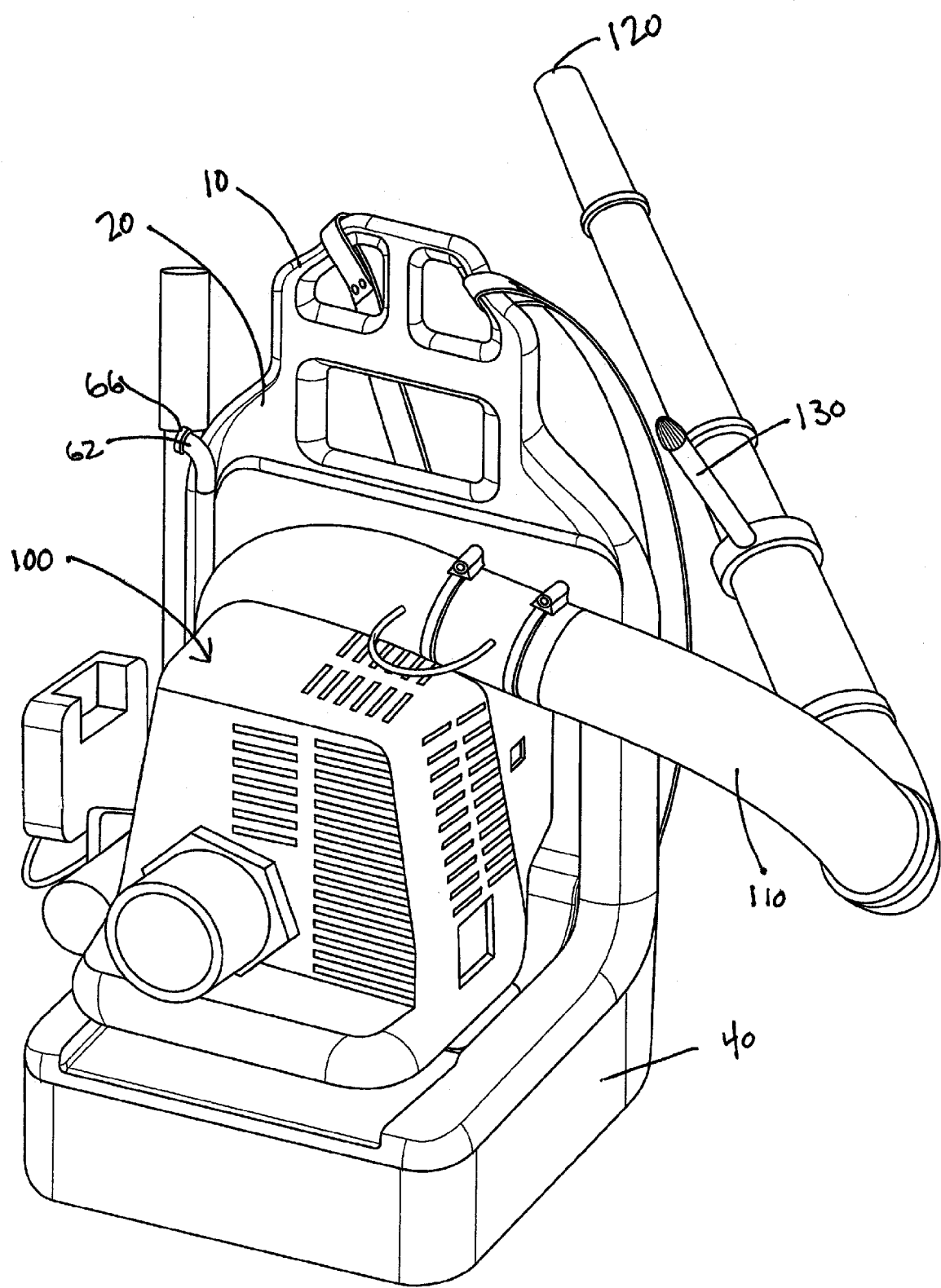
FIG. 1 is a rear perspective view of an air blower positioned on a backpack liquid storage container in accordance to one embodiment of the present invention.
Figure 2:
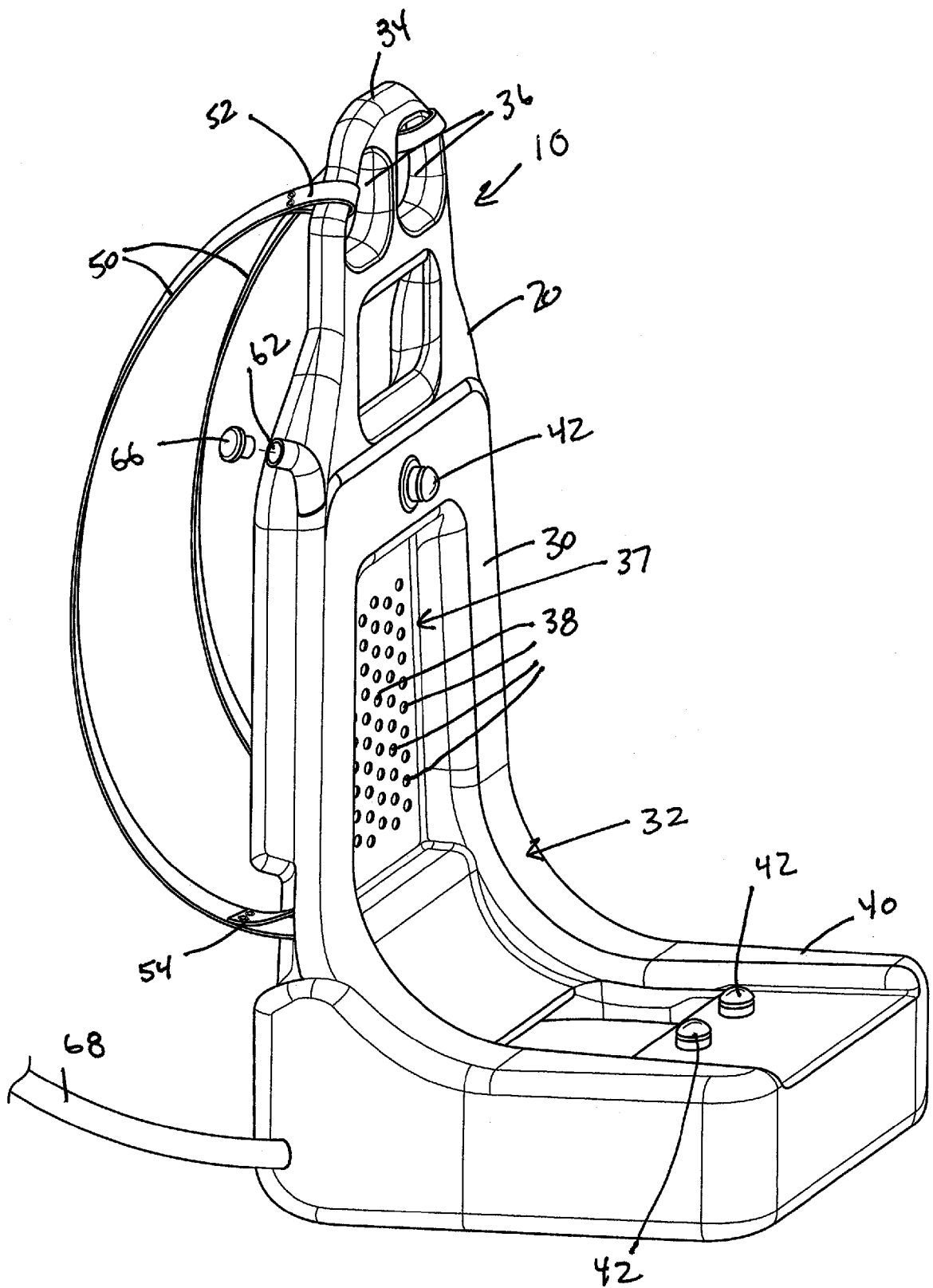
FIG. 2 is a perspective view of a backpack liquid storage container in accordance to one embodiment of the present invention.
Figure 3:
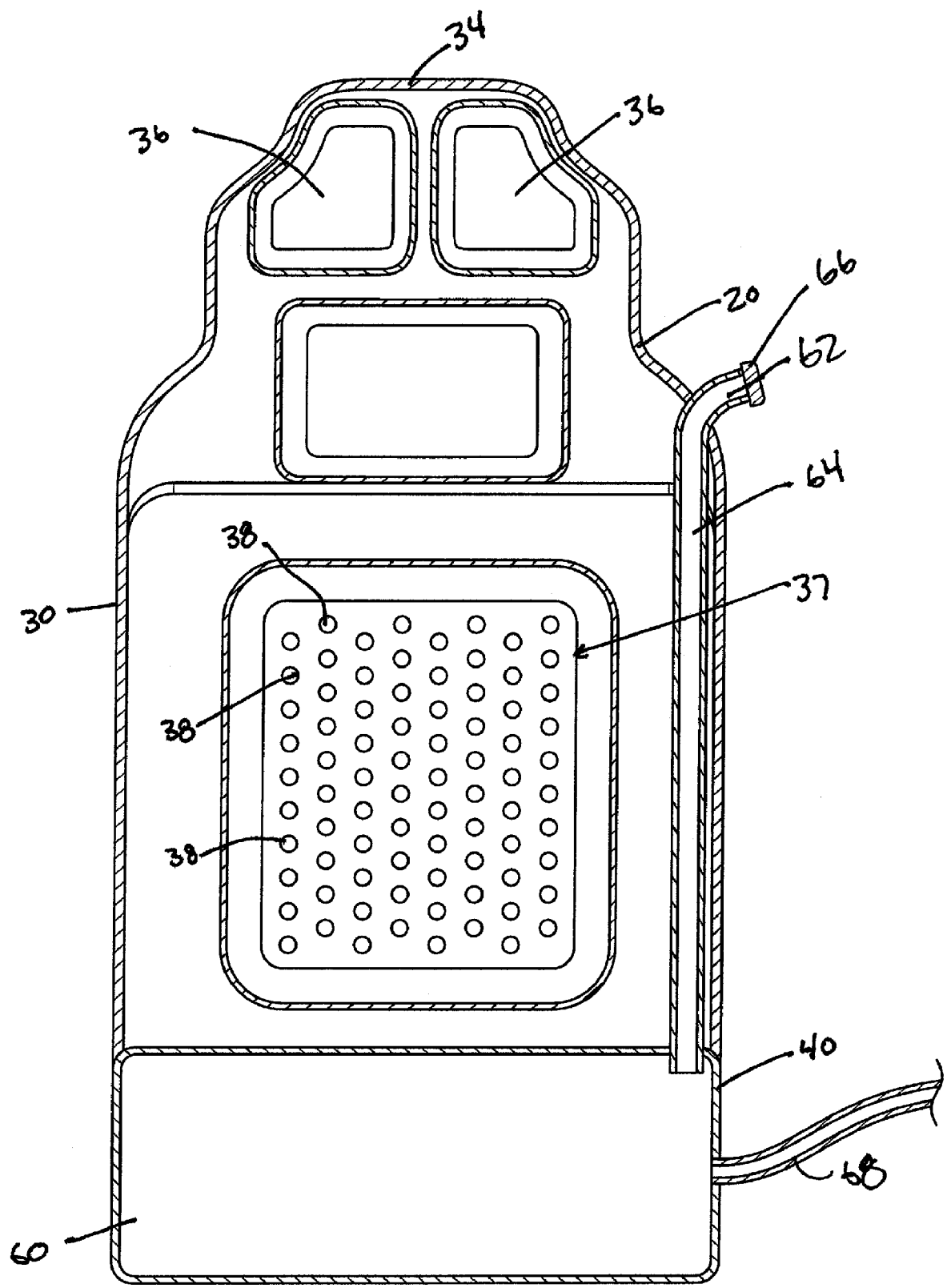
FIG. 3 is a section view of a backpack liquid storage container in accordance to one embodiment of the present invention illustrating the reservoir contained in the lower portion of the backpack.
Figure 4:
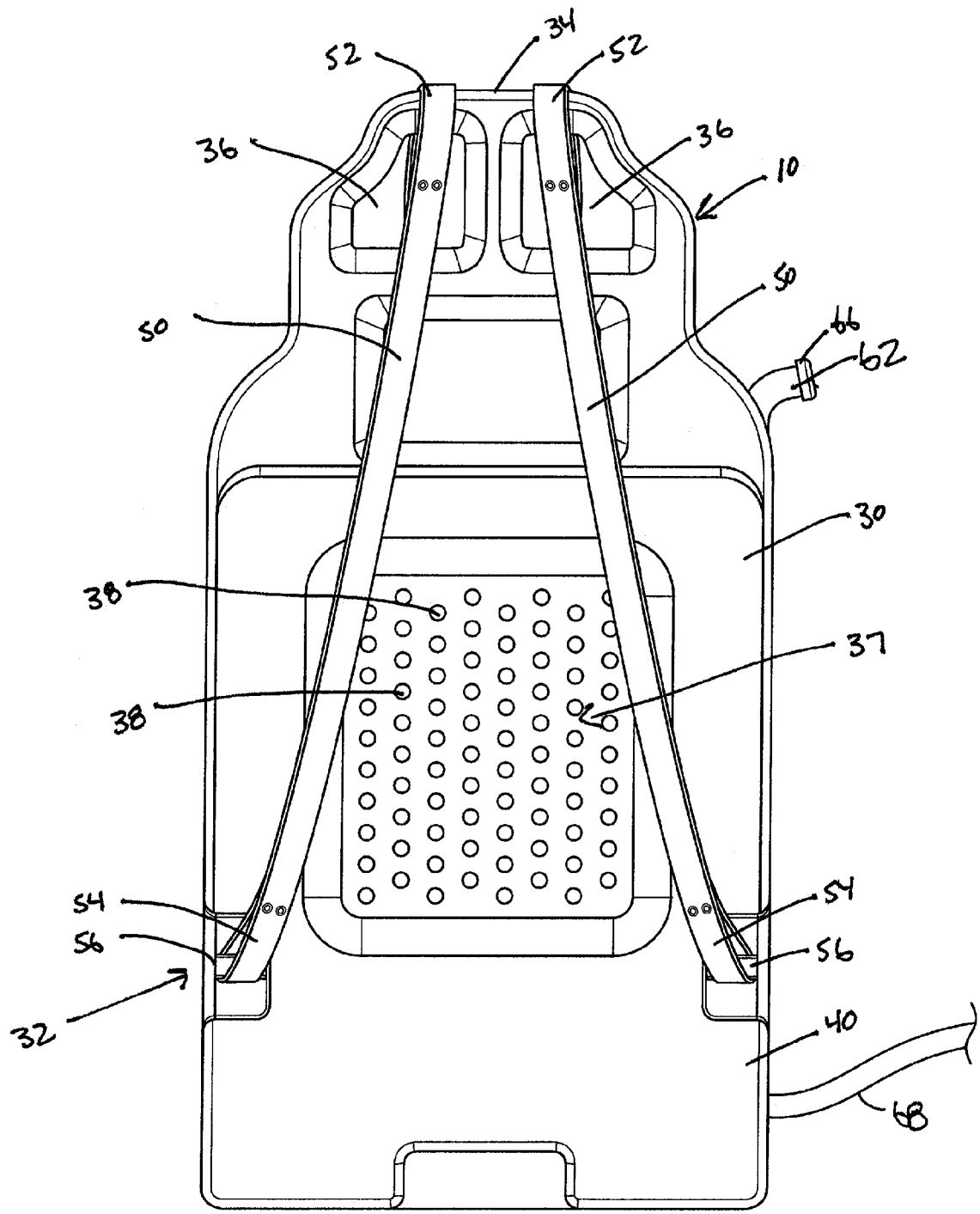
FIG. 4 is a rear view of a backpack liquid storage container in accordance to one embodiment of the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring first to Figures, a backpack having a reservoir 10 is provided to hold a motorized air blower 100. The air blower 100 includes a blower nozzle assembly 110 coupled to the air blower 100 and conducts a stream of air towards a nozzle end 120. The blower nozzle assembly 110 may also include a handle 130 that may be grasped by an operator during use.

The backpack 10 has a substantially L shaped frame 20 defined by a first portion 30 and a second portion 40 extending substantially perpendicularly from the lower end 32 of the first portion 30. The first portion 30 also includes a pair of openings 36 on the upper end 34. The first portion 30 includes a plurality of apertures 38 positioned about a central region 37 thereof. The apertures 38 form a connection grid to help secure (through bolts or other securing means) various types or models of air blowers to the frame 20.

Resilient members 42 are positioned on the first and second portion 30 and 40, respectively. The resilient members 42 help cushion the air blower 100. Preferably, a single central resilient member is positioned on the first portion 30 and a pair of resilient members is positioned on the second portion 40. It is believed that this helps balance the air blower 100 on the frame 20 such that the air blower 100 does not rock or bounce during operation.

The second portion 40 includes a cavity or hollowed out section and thus has a built-in reservoir 60 or tank designed to hold a fluid, liquid, particulate, solution, or mixture thereof (generally referred to as a "mixture"). The reservoir 60 may occupy the entire second portion, a portion thereof, and/or the entire first portion or portion thereof. Illustrated is but a single embodiment of the reservoir 60, which is shown to occupy the internal space defined by the second portion 40 of the frame 20. An inlet 62 is positioned on the first portion 30 that feeds into a supply pipe or channel 64 that leads to the reservoir 60. The inlet 62 will typically have a cap 66 that is removable such that the operator may fill the reservoir 60 with a mixture. The reservoir 60 further includes a tube 68 extending out from the lower end of the reservoir 60 such that the reservoir 60 is able to feed the mixture by gravity. However, the present invention may use suction to withdraw the mixture from the reservoir 60.

Shoulder straps 50 are attached to the first portion 30 by having one end 52 of the straps looped or secured through or to the openings 36 and a second end 54 secured to members 56 on the lower end 32 of the first portion 30.

Figure 5:
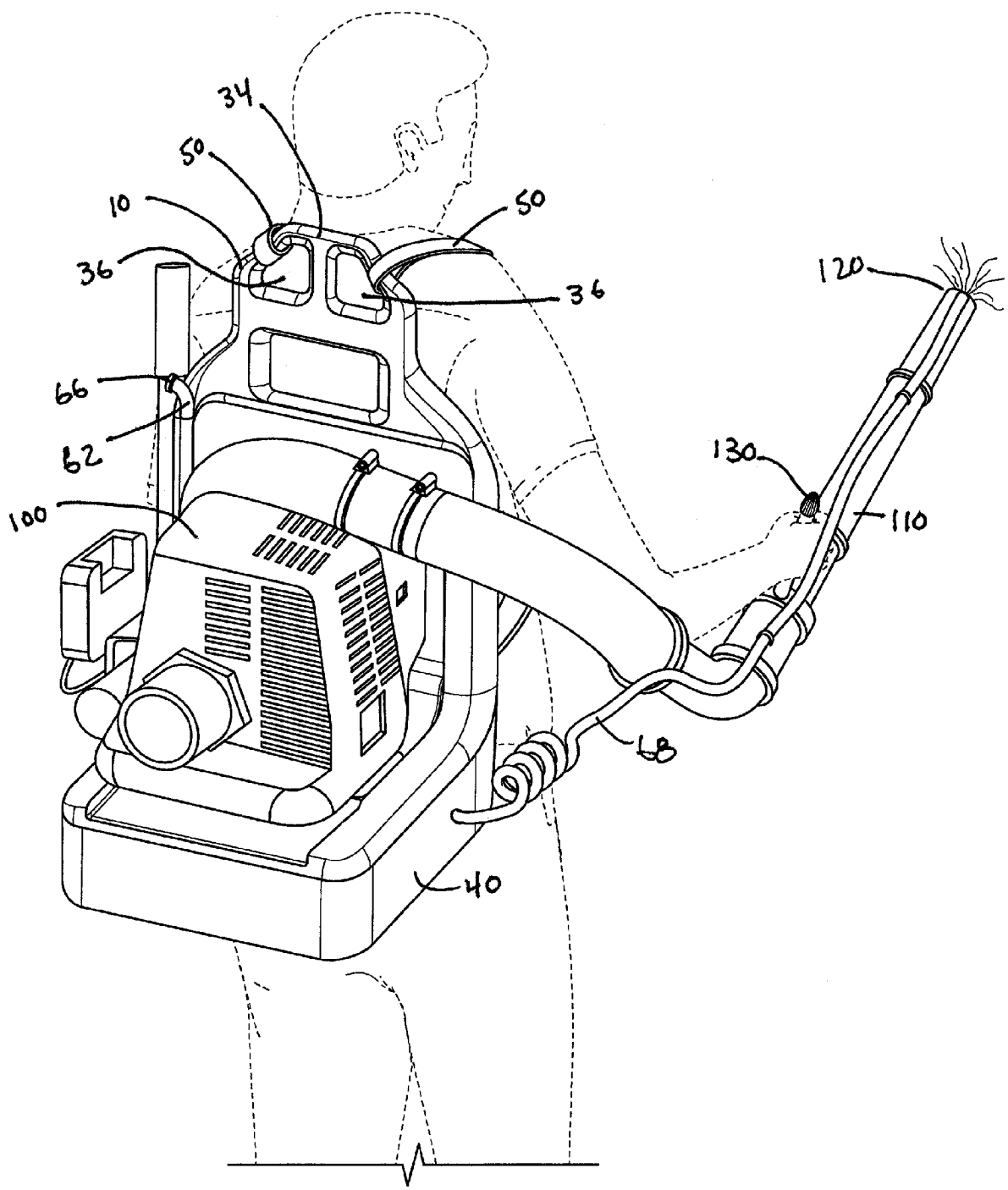
FIG. 5 is a rear perspective view of a backpack liquid storage container and an air blower in accordance to one embodiment of the present invention tailored for holding liquid yard treatment for a treatment sprayer.

In one embodiment (FIG. 5), the tube 68 feeds the mixture to the end 120 of the air blower 100, where the mixture may be blown onto the yard. This type of yard treatment delivery system will eliminate the need for heavy tanks on top of the blower as mentioned in the prior art. Valves may be incorporated along the tube to help control the flow of mixture to the end of the air blower 100.

Figure 6:
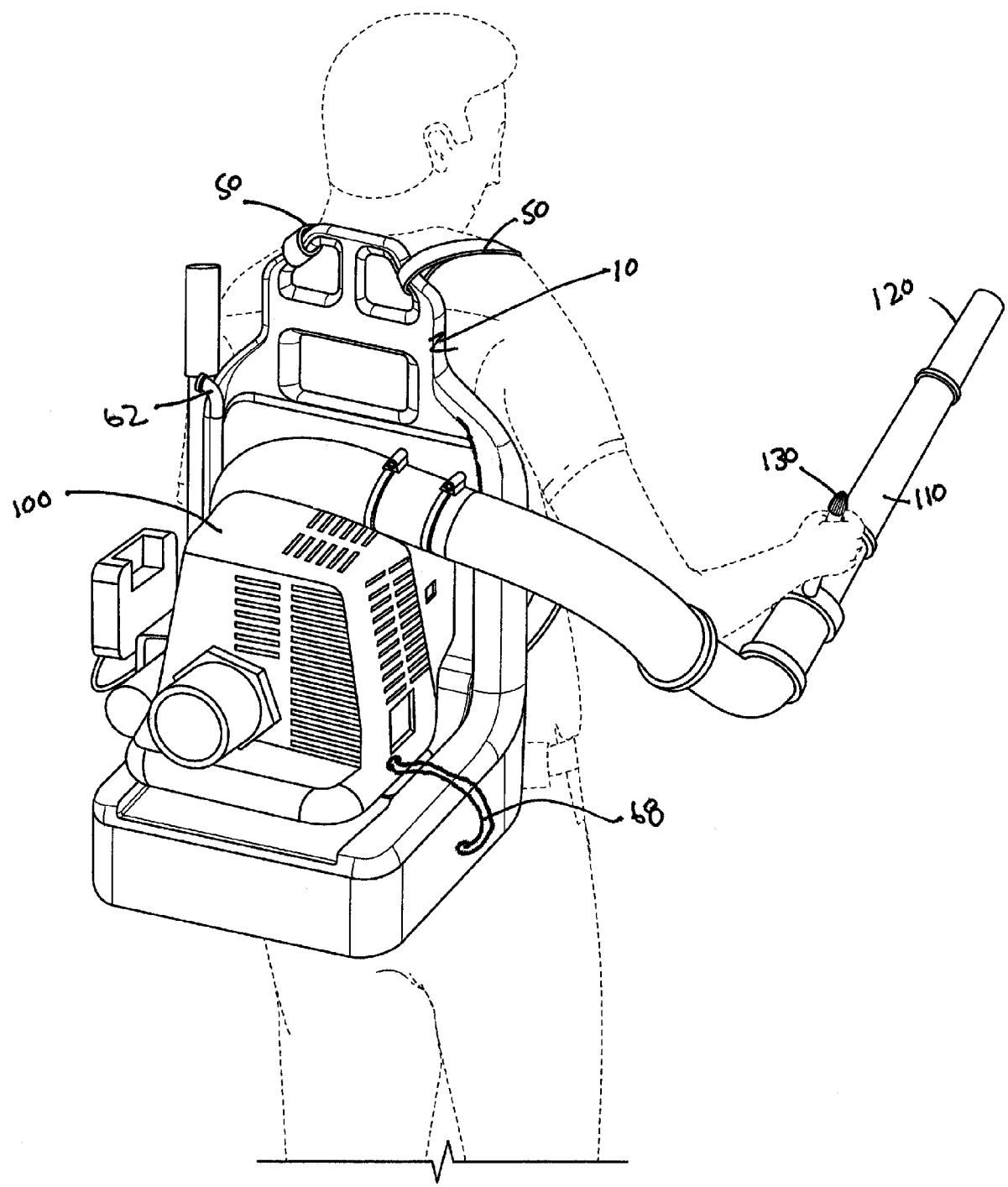
FIG. 6 is a rear perspective view of a backpack liquid storage container and an air blower in accordance to one embodiment of the present invention tailored for holding fuel for a gas powered air blower.

In another embodiment (FIG. 6) the tube 68 feeds into the air blower. This type of system would be useful when the reservoir 60 is filed with gas or gas/oil mixture for a gas powered air blower. The prior art's use of a separate small gas container is now eliminated. In addition, since the reservoir 60 has a larger capacity, the air blower can be used for a longer period without having to refuel.

In another embodiment (FIG. 7) the frame 10 may include an air inlet 70 and a small tube 72 that connects to the air blower. Air may then be blown into the reservoir 60 to pressurize the reservoir 60 keeping the flow of mixture steady.

It should be further stated the specific information shown in the drawings but not specifically mentioned above may be ascertained and read into the specification by virtue of a simple study of the drawings. Moreover, the invention is also not necessarily limited by the drawings or the specification as structural and functional equivalents may be contemplated and incorporated into the invention without departing from the spirit and scope of the novel concept of the invention. It is to be understood that no limitation with respect to the specific embodiments illustrated herein is intended or should be inferred. It is, of course, intended to cover by the appended claims all such modifications as fall within the scope of the claims.

I claim:

1. A backpack power blower system comprising:
   a frame having a first portion and a second portion extending outwardly from said first portion, the second portion being adapted for carrying an air blower thereon, the second portion having an interior cavity for holding a mixture, an inlet portion along the first portion and in communication with a channel that feeds into said interior cavity, the inlet providing a means to fill the cavity with said mixture, a tube having one end in fluid communication with the cavity for expelling the mixture from the cavity for external use; and
   a means for attaching said frame on the back of an operator.

2. The system of claim 1, wherein the frame further includes a central region on the first portion defined with a plurality of apertures adapted for securing the air blower thereto.

3. The system of claim 1, wherein the frame further includes a plurality of bumper positioned on the first and second portions.

4. The system of claim 1, wherein the frame further includes a pair of openings positioned in the first portion and a pair of members positioned on the second portion and wherein the means for attaching said frame includes a pair of straps secured to the openings and the members to define a pair of loops through which an operator may secure its arms therethrough.

5. The system of claim 1, wherein the tube has a second end terminating into a blower tube defined by the air blower, and wherein the mixture is a yard treatment solution.

6. The system of claim 5, further comprising a second tube feeding air from the air blower into the cavity to aid in forcing the mixture out of the cavity.

7. The system of claim 1, wherein the tube has a second end in fluid communication with the air blower for feeding the mixture into the air blower, wherein the mixture is a fuel or fuel/oil solution.

* * * * *

UNITED STATES PATENT AND TRADEMARK OFFICE
CERTIFICATE OF CORRECTION

PATENT NO. : 7,437,796 B2  Page 1 of 1
APPLICATION NO. : 11/626645
DATED : October 21, 2008
INVENTOR(S) : Craig Rappin It is certified that error appears in the above-identified patent and that said Letters Patent is hereby corrected as shown below:

In the Abstract, Line 1, delete "bower" and replace with --blower--.

Figure 7:
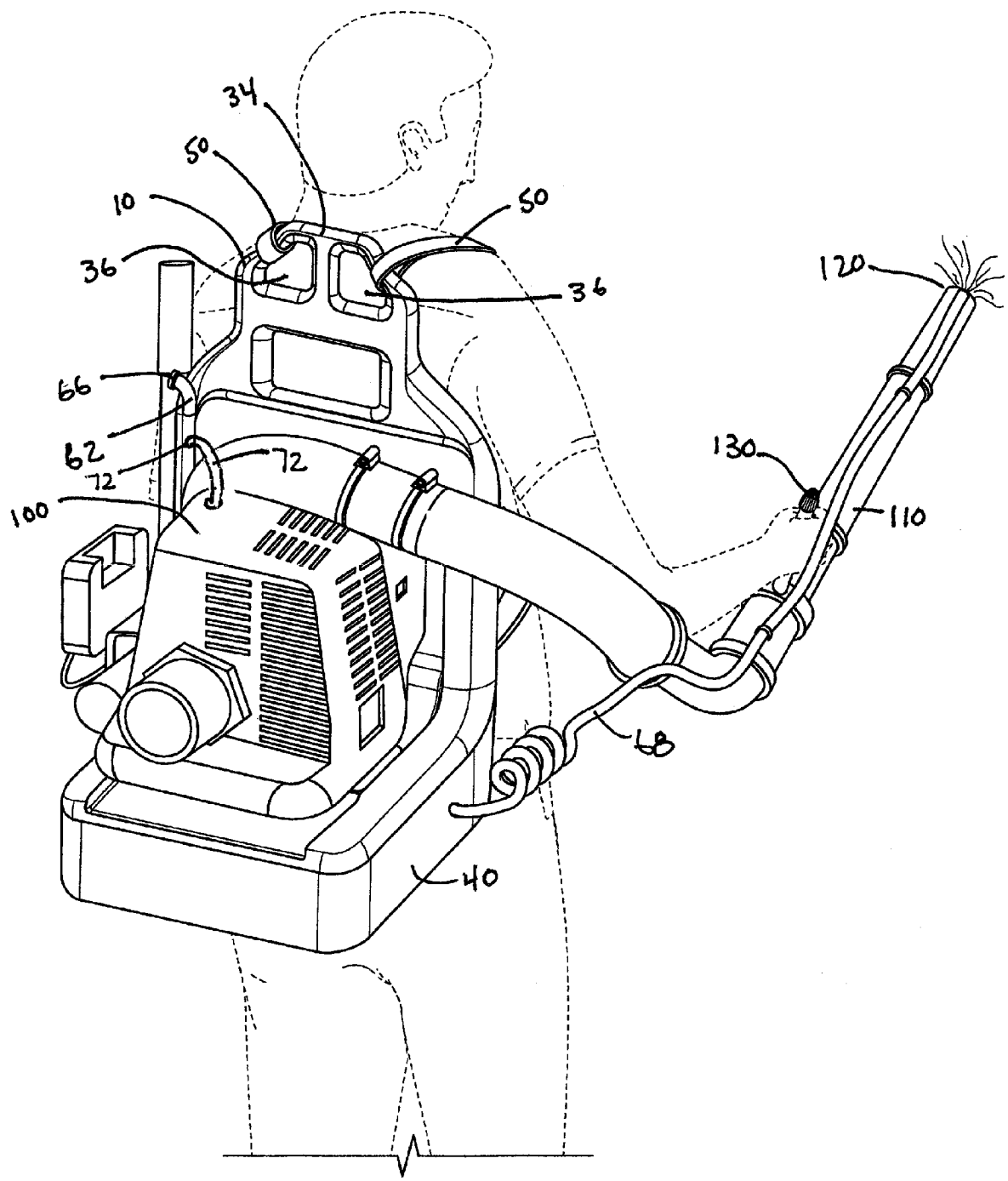
FIG. 7 is a rear perspective view of a backpack liquid storage container and an air blower in accordance to one embodiment of the present invention tailored for holding liquid yard treatment for a treatment sprayer and for tapping the air blower for a pressurization feed into the container.

In the drawings, Sheet 7, Fig. 7, delete reference numeral "72" indicating the air inlet and replace with --70--.

Column 1, Lines 40 and 57, delete "bower" and replace with --blower--.

Column 2, Line 64, delete "Figures," and replace with --Figures 1-4,--.

Signed and Sealed this

Sixth Day of January, 2009

JON W. DUDAS
*Director of the United States Patent and Trademark Office*